US012767593B2

(12) United States Patent
Azuma

(10) Patent No.: US 12,767,593 B2
(45) Date of Patent: Oct. 20, 2026

(54) METHOD FOR MANUFACTURING GLASS PLATE, METHOD FOR MANUFACTURING GLASS SUBSTRATE FOR MAGNETIC DISK, METHOD FOR MANUFACTURING MAGNETIC DISK, AND APPARATUS FOR PROCESSING GLASS PLATE

(71) Applicant: HOYA CORPORATION, Tokyo (JP)

(72) Inventor: Shuhei Azuma, Hung Yen Province (VN)

(73) Assignee: HOYA CORPORATION, Tokyo (JP)

( * ) Notice: Subject to any disclaimer, the term of this patent is extended or adjusted under 35 U.S.C. 154(b) by 229 days.

(21) Appl. No.: 18/276,685

(22) PCT Filed: Jan. 28, 2022

(86) PCT No.: PCT/JP2022/003442

§ 371 (c)(1), (2) Date: Aug. 10, 2023

(87) PCT Pub. No.: WO2022/163841

PCT Pub. Date: Aug. 4, 2022

(65) Prior Publication Data

US 2024/0101473 A1 Mar. 28, 2024

(30) Foreign Application Priority Data

Jan. 28, 2021 (VN) .............................. 1-2021-00461

(51) Int. Cl.

*C03C 23/00* (2006.01)
*B23K 26/402* (2014.01)

(Continued)

(52) U.S. Cl.

CPC ........ *C03C 23/0025* (2013.01); *B23K 26/402* (2013.01); *C03C 15/02* (2013.01);

(Continued)

(58) Field of Classification Search

CPC ........ B23K 26/06; B23K 26/35; B23K 26/03; B23K 26/04; G11B 7/2531; G11B 7/26; C03C 23/0025

See application file for complete search history.

(56) References Cited

U.S. PATENT DOCUMENTS 6,521,862 B1 * 2/2003 Brannon ............ G11B 23/0021
10,357,850 B2 * 7/2019 Zhang .................. B23K 26/359

(Continued)

FOREIGN PATENT DOCUMENTS

CN 107922237 A 4/2018
JP 2002150546 A 5/2002

(Continued)

OTHER PUBLICATIONS

Translation of the International Search Report mailed on Apr. 19, 2022.

*Primary Examiner* — Erin Snelting
*Assistant Examiner* — Steven S Lee
(74) *Attorney, Agent, or Firm* — Spencer Fane LLP

(57) ABSTRACT

A method for manufacturing a glass plate includes processing for irradiating an inner circumferential edge surface extending along an inner hole in an annular glass plate with a laser beam along the inner circumferential edge surface. When the inner circumferential edge surface is irradiated with the laser beam, the laser beam is concentrated by a condenser lens and formed into diffused light, and the inner circumferential edge surface is irradiated with the diffused light from a direction inclined with respect to a main surface of the glass plate.

6 Claims, 2 Drawing Sheets

(51) Int. Cl.

| | |
|---|---|
| ***C03C 15/02*** | (2006.01) |
| ***G11B 5/73*** | (2006.01) |
| ***G11B 5/84*** | (2006.01) |
| *B23K 103/00* | (2006.01) |

(52) U.S. Cl.

CPC ........ *G11B 5/73921* (2019.05); *G11B 5/8404* (2013.01); *B23K 2103/54* (2018.08)

(56) References Cited

U.S. PATENT DOCUMENTS

| | | | | |
|---|---|---|---|---|
| 2002/0108400 | A1* | 8/2002 | Watanabe | G11B 5/73921 428/64.2 |
| 2016/0311717 | A1* | 10/2016 | Nieber | C03B 23/02 |
| 2018/0001425 | A1* | 1/2018 | Sercel | B23K 26/70 |
| 2018/0057390 | A1 | 3/2018 | Hackert et al. | |
| 2022/0089479 | A1 | 3/2022 | Azuma | |
| 2022/0227654 | A1 | 7/2022 | Azuma | |

FOREIGN PATENT DOCUMENTS

| | | | | | |
|---|---|---|---|---|---|
| JP | 2013137849 | A | * | 7/2013 | |
| JP | 2018519229 | A | | 7/2018 | |
| JP | 2020193124 | A | * | 12/2020 | B23K 26/402 |
| WO | 2014051127 | A1 | | 4/2014 | |
| WO | WO-2019151185 | A1 | * | 8/2019 | G11B 5/84 |
| WO | 2020111282 | A1 | | 6/2020 | |
| WO | 2020262702 | A1 | | 12/2020 | |

* cited by examiner

METHOD FOR MANUFACTURING GLASS PLATE, METHOD FOR MANUFACTURING GLASS SUBSTRATE FOR MAGNETIC DISK, METHOD FOR MANUFACTURING MAGNETIC DISK, AND APPARATUS FOR PROCESSING GLASS PLATE

CROSS-REFERENCE TO RELATED APPLICATIONS

This U.S. National stage application of International Patent Application No. PCT/JP2022/003442, filed on Jan. 28, 2022, which, in turn, claims priority to Japanese Patent Application No. 1-2021-00461, filed in Vietnam on Jan. 28, 2021. The entire contents of Vietnamese Patent Application No. 1-2021-00461 are hereby incorporated herein by reference.

FIELD OF THE INVENTION

The present invention relates to a method for manufacturing a glass plate, the method including processing for irradiating an inner circumferential edge surface of an annular glass plate with a laser beam, a method for manufacturing a glass substrate for a magnetic disk (magnetic-disk glass substrate) using this method for manufacturing a glass plate, a method for manufacturing a magnetic disk, and an apparatus for processing a glass plate.

BACKGROUND INFORMATION

A magnetic disk obtained by providing a magnetic layer on an annular nonmagnetic glass substrate for a magnetic disk is used in a hard disk drive (HDD) device for recording data.

When a magnetic-disk glass substrate is manufactured, particles are likely to form on edge surfaces of an annular glass plate that is the base of the magnetic-disk glass substrate that will be a final product, and therefore it is preferable that edge surfaces of the annular glass plate are smoothened in order to inhibit minute particles from adhering to main surfaces thereof, and from adversely affecting the performance of the magnetic disk. Also, it is preferable that edge surfaces of the glass plate have target shapes to precisely incorporate a magnetic disk into an HDD device, and make an outer circumferential edge surface of the glass substrate suitable to be held by a jig for holding the outer circumferential edge surface when a magnetic film is formed on the main surfaces of the glass substrate.

A method for chamfering an edge of a glass plate using a laser beam is known as a method for making an edge surface of an annular glass plate into a target shape. A technique is known by which it is possible to easily smoothen inner and outer circumferential edge surfaces of a glass substrate for an information recording medium, with use of a laser beam, at low costs, for example (JP 2002-150546A).

Specifically, when an inner circumferential edge surface is chamfered, a reflective mirror is arranged in an inner hole in an annular glass plate, a laser beam is emitted from above a main surface of the glass plate toward the reflective mirror, and the inner circumferential edge surface is irradiated with reflected light of a laser beam reflected by the reflective mirror.

SUMMARY

However, if inner circumferential edge surfaces of a plurality of glass plates are irradiated with a laser beam using the above-described technique, in order to avoid collision between a glass plate and the reflective mirror, every time a glass plate is replaced, the reflective mirror needs to be retrieved from the inner hole and the reflective mirror needs to be moved into the inner hole in a glass plate that is to be processed next. In this case, a moving mechanism for moving the reflective mirror is required, and it also takes time to move the reflective mirror. On the other hand, if the glass plate is moved without moving the reflective mirror, the path on which the glass plate is to be moved also becomes complicated. Thus, the configuration of a photoirradiation device with use of a reflective mirror becomes complicated, and productivity deteriorates.

In view of this, the present invention aims to provide a method for manufacturing a glass plate by which an annular glass plate can be irradiated with a laser beam with a simple device configuration when manufacturing the glass plate by irradiating an inner circumferential edge surface of the glass plate with a laser beam, a method for manufacturing a magnetic-disk glass substrate, and a method for manufacturing a magnetic disk.

One aspect of the present invention is a method for manufacturing a glass plate, the method including processing for irradiating an inner circumferential edge surface extending along an inner hole in an annular glass plate with a laser beam along the inner circumferential edge surface.

In the processing, when the inner circumferential edge surface is irradiated with the laser beam, the laser beam is concentrated by a condenser lens and formed into diffused light, and the inner circumferential edge surface is irradiated with the diffused light from a direction inclined with respect to a main surface of the glass plate.

It is preferable that corner portions present between the inner circumferential edge surface and the main surfaces on both sides of the glass plate are chamfered through the processing.

It is preferable that an inclination angle of a central axis of the laser beam with respect to the main surface is 20 degrees or less.

It is preferable that a diffusion angle of the laser beam is 20 degrees or less.

It is preferable that the corner portions present between the inner circumferential edge surface and the main surfaces on both sides of the glass plate are chamfered through the processing, and a cross-sectional shape of the inner circumferential edge surface in which the corner portions are chamfered is line-symmetric with respect to a center line that passes through the center of the glass plate in a thickness direction of the glass plate and that is parallel to the main surfaces.

It is preferable that a position where the laser beam is concentrated by the condenser lens is located above a plane that includes the main surface outward in a radial direction of a position on the inner circumferential edge surface that faces an irradiation position on the inner circumferential edge surface that is irradiated with the laser beam across the center of the inner hole.

It is preferable that the glass plate is a glass substrate that is a base of a glass substrate for a magnetic disk.

It is preferable to grind or polish the main surface of the glass plate without polishing the inner circumferential edge surface, after irradiation with the laser beam.

Another aspect of the present invention is a method for manufacturing a magnetic-disk glass substrate. With this method for manufacturing a magnetic-disk glass substrate, after the glass plate is manufactured using the method for manufacturing a glass plate, the magnetic-disk glass substrate is manufactured by grinding or polishing the main surface of the glass plate.

Yet another aspect of the present invention is a method for manufacturing a magnetic disk, in which a magnetic film is formed on the main surface of the glass plate manufactured using the method for manufacturing a magnetic-disk glass substrate.

Yet another aspect of the present invention is an apparatus for processing a glass plate configured to perform processing for irradiating an inner circumferential edge surface extending along an inner hole in an annular glass plate with a laser beam along the inner circumferential edge surface.

In the processing, when the inner circumferential edge surface is irradiated with the laser beam, the laser beam is concentrated by a condenser lens and formed into diffused light, and the inner circumferential edge surface is irradiated with the diffused light from a direction inclined with respect to a main surface of the glass plate.

It is preferable that corner portions present between the inner circumferential edge surface and the main surfaces on both sides of the glass plate are chamfered through the processing.

According to the above-described method for manufacturing a glass plate, method for manufacturing a magnetic-disk glass substrate, method for manufacturing a magnetic disk, and apparatus for processing a glass plate, it is possible to perform irradiation with a laser beam, using a device that has a simple configuration and that manufactures a glass plate by irradiating an inner circumferential edge surface of an annular glass plate with a laser beam.

DETAILED DESCRIPTION OF THE EMBODIMENTS

The following describes a method for manufacturing a glass plate, an apparatus for processing a glass plate, a method for manufacturing a magnetic-disk glass substrate, and a method for manufacturing a magnetic disk according to one embodiment in detail.

Figure 1A:
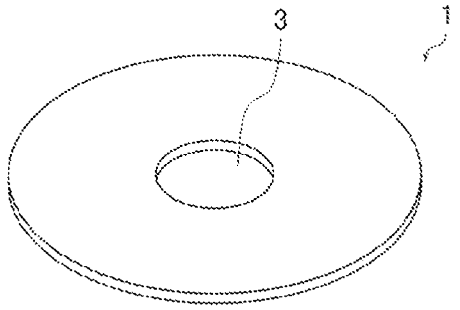
FIG. 1A is a perspective view of one example of a glass plate manufactured using a method for manufacturing a glass plate according to one embodiment.

An edge surface of an annular glass plate is chamfered, and the glass plate manufactured using a method for manufacturing a glass plate according to one embodiment is to be used in a magnetic-disk glass substrate, for example. FIG. 1A is a perspective view of one example of an annular glass plate manufactured using a method for manufacturing a glass plate according to one embodiment. The annular glass plate has a circular outer circumferential surface. Also, the annular glass plate has an inner hole that is concentric with the above-described circle and has an inner circumferential surface. Also, the annular glass plate has a pair of main surfaces.

A glass plate 1 shown in FIG. 1A can be used as a glass substrate for a magnetic disk. If the glass plate 1 is used as a glass substrate for a magnetic disk, there is no limitation on the size of the magnetic-disk glass substrate. A magnetic-disk glass substrate having a nominal diameter of 2.5 inches or 3.5 inches may be used, for example. In the case of a magnetic-disk glass substrate with a nominal diameter of 2.5 inches, the outer diameter thereof is in a range of 55 mm to 70 mm, and, for example, the outer diameter thereof is 65 mm or 67 mm, the diameter of the inner hole is 20 mm, and the thickness thereof is in a range of 0.3 to 1.3 mm, for example. In the case of a magnetic-disk glass substrate with a nominal diameter of 3.5 inches, the outer diameter thereof is in a range of 85 mm to 100 mm, and, for example, the outer diameter thereof is 95 mm, 96 mm, or 97 mm, the diameter of the inner hole is 25 mm, and the thickness thereof is in a range of 0.3 to 1.3 mm, for example.

Figure 1B:
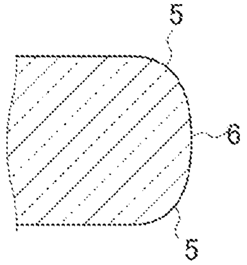
FIG. 1B is a diagram showing one example of a cross-sectional shape of an edge surface of the glass plate after a chamfered surface is formed.

The glass plate 1 shown in FIG. 1A is provided with chamfered surfaces (or chamfered portions) through edge surface shaping in which corner portions present between edge surfaces (an inner circumferential edge surface and/or an outer circumferential edge surface) and the main surfaces thereof are chamfered. Note that, even when a chamfered portion, which is a chamfered region as will be described later, is not a flat surface, the chamfered portion is referred to as a "chamfered surface" in the present invention. FIG. 1B is a diagram showing one example of a cross-sectional shape of the entire edge surface whose corner portions are chamfered according to the present invention. The edge surface whose two corner portions are chamfered has two chamfered surfaces 5. A "cross-sectional shape" refers to the shape of the glass plate 1 passing through the center of the annular shape of the glass plate 1 and extending along a radial direction and a plate thickness direction. As shown in FIG. 1B, the cross-sectional shape of a chamfered surface 5 is a curved surface shape formed by a smooth curve protruding outward from the surface of the glass plate. As with an example shown in FIG. 1B, the cross-sectional shape of the edge surface subjected to chamfering (chamfered edge surface) may be a shape in which the chamfered surfaces 5 respectively connected to two main surfaces, and a side wall surface 6 present between the two chamfered surfaces 5 form one curved surface as a whole. Note that, as another example of the cross-sectional shape shown in FIG. 1B, the chamfered surfaces respectively connected to two main surfaces may each have a curved shape, and a side wall surface present between the two chamfered surfaces may have a straight shape orthogonal to the main surfaces or a curved shape that is curved and separate from the chamfered surfaces. A chamfering length in the radial direction of the chamfered glass plate 1 can be defined as the difference between the radius of the glass plate 1 at a position where the edge surface protrudes most in the radial direction and the radius thereof at a position where the main surface starts to incline toward the edge surface, and the chamfering length may be 30 to 200 μm, for example.

In the case of a magnetic-disk glass substrate, a magnetic disk is produced by grinding and/or polishing the main surfaces of the glass plate 1 as needed, and then forming a magnetic film on the main surfaces of the glass plate 1.

Figure 1C:
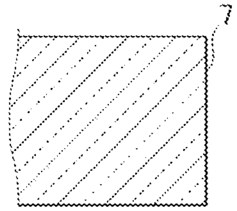
FIG. 1C is a diagram showing one example of a cross-sectional shape of an edge surface of a glass plate before a chamfered surface is formed.

FIG. 1C is a diagram showing one example of the cross-sectional shape of an inner circumferential edge surface 7 of the glass plate before a chamfered surface is formed (hereinafter, also referred to as a "glass blank"). By irradiating the inner circumferential edge surface 7 with a laser beam, which will be described later, a corner portion of a boundary portion between a main surface and the inner circumferential edge surface 7 of the glass blank is heated to a temperature that is equal to or higher than the softening point thereof, and thus the corner portion is partially melted, thus forming a curved surface as shown in FIG. 1B, for example, as a result of which chamfering processing is performed. The inner circumferential edge surface 7 of the glass blank before the chamfered surface is formed is a surface that is substantially orthogonal to the main surfaces of the glass blank. Similarly to the inner circumferential edge surface 7, an outer circumferential edge surface of the glass blank also has a surface that is substantially orthogonal to the main surfaces of the glass blank. It is possible to chamfer corner portions present between the main surfaces and the inner circumferential edge surface 7 to form a chamfered surface 5 shown in FIG. 1B, for example, by irradiating such surfaces with a laser beam, which will be described later. Note that the cross-sectional shape of the inner circumferential edge surface 7 shown in FIG. 1C is one example, and is not limited to a shape that is substantially orthogonal to the main surfaces, and may be a shape with slightly round corner portions, or a shape in which the corner portions thereof are inclined with respect to the main surfaces. It is preferable that, before the chamfered surface 5 is formed, the cross-sectional shape of the inner circumferential edge surface 7 is line-symmetric (described later) with respect to a center line that passes through the center of the thickness in the thickness direction of the glass blank and that is parallel to the main surfaces because the cross-sectional shape of the inner circumferential edge surface obtained after irradiation with the laser beam, i.e., the cross-sectional shape of the inner circumferential edge surface obtained after the chamfered surface 5 is formed, is likely to be line-symmetric in a similar manner.

Figure 2:
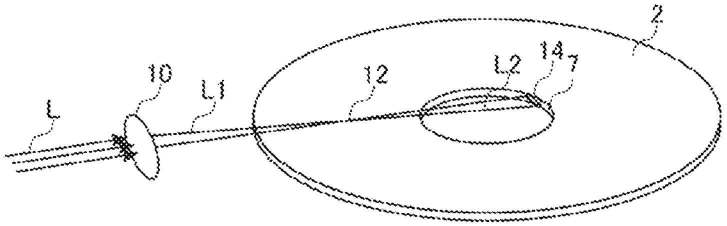
FIG. 2 is a diagram illustrating photoirradiation performed in a method for manufacturing a glass plate according to one embodiment.
Figure 3:
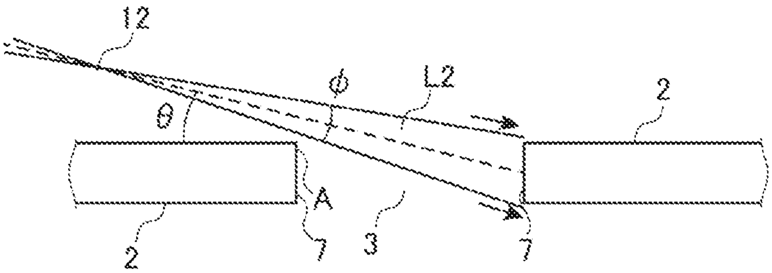
FIG. 3 is a diagram illustrating photoirradiation performed in a method for manufacturing a glass plate according to one embodiment.

FIGS. 2 and 3 are diagrams illustrating photoirradiation performed in a method for manufacturing the glass plate 1 according to one embodiment. The chamfered surface 5 can be formed on the inner circumferential edge surface 7 through irradiation with a laser beam L, and the surface roughness of the inner circumferential edge surface 7 or the chamfered surface 5 can be reduced. The surface roughness of the inner circumferential edge surface (the chamfered surface 5 and/or the side wall surface 6) after irradiation with the laser beam L is 50 nm or less in terms of the arithmetic average roughness Ra (JIS B0601 2001), and/or, 500 nm or less in terms of the maximum height Rz (JIS B0601 2001). The surface roughness can be measured using a laser microscope, for example.

As shown in FIGS. 2 and 3, when the inner circumferential edge surface 7 extending along an inner hole 3 in the annular glass plate before being subjected to photoirradiation (i.e., the annular glass blank 2) is irradiated with the laser beam L, the inner circumferential edge surface 7 is irradiated with the laser beam L such that the laser beam L moves relative to the inner circumferential edge surface 7 in a circumferential direction of the glass blank 2. In other words, at this time, the laser beam L is caused to pass through a position 12 (light concentration position) where the laser beam L is concentrated by a condenser lens 10 to change from convergent light L1 to diffused light L2, and the inner circumferential edge surface 7 is irradiated with this diffused light L2 from a direction inclined with respect to the main surfaces of the glass blank 2. That is to say, in the embodiment shown in FIGS. 2 and 3, the laser beam L is concentrated by the condenser lens 10 and formed into the diffused light L2, and the inner circumferential edge surface 7 is irradiated with this diffused light L2 from a direction inclined with respect to the main surfaces. The wording "irradiation with the diffused light L2 from a direction inclined with respect to the main surfaces" refers to irradiation with the central axis of the luminous flux of the diffused light L2 inclined with respect to the main surfaces. In other words, in the embodiment shown in FIGS. 2 and 3, when the laser beam L concentrated by the condenser lens 10 has passed through a light concentration position (focusing point) 12 and changes into the diffused light L2, the inner circumferential edge surface 7 is irradiated therewith. Note that convergence and diffusion of the laser beam L need only to occur at least in the plate thickness direction of the glass blank.

The luminous flux of the diffused light L2 is small in the vicinity of the light concentration position 12. If the luminous flux is large, a portion of the annular glass blank 2 that faces an irradiation position 14 of the inner circumferential edge surface 7 that is irradiated with the laser beam L across the center of the glass blank 2 obstructs an optical path and light is scattered, or even if light passes through the opposing portion, the intensity of transmitted light decreases, making it difficult to form the chamfered surface 5, or it is not possible to secure enough light intensity to make the cross-sectional shape of the inner circumferential edge surface line-symmetric.

In this embodiment, the amount of luminous flux can be reduced near a position (a later-described position A) where the glass blank 2 is likely to obstruct an optical path, by using the diffused light L2 of the light that has passed through the light concentration position 12. As a result, the laser beam L is likely to avoid the position where the glass blank 2 is likely to obstruct the optical path. Thus, it is possible to reduce the inclination angle of the diffused light L2 with respect to the main surfaces of the glass blank 2.

Also, by irradiating the inner circumferential edge surface 7 with the diffused light L2 at a small inclination angle with respect to the main surfaces of the glass blank 2, at the time of irradiation, the temperatures of corner portions on both sides in the thickness direction of the inner circumferential edge surface 7 at the light concentration position 12 approach substantially the same temperature. Thus, the cross-sectional shape of the inner circumferential edge surface can be easily made into a line-symmetric target shape. That is, the cross-sectional shape of the inner circumferential edge surface can be made line-symmetric with respect to the center line that passes through the center of the glass plate 1 in the thickness direction of the glass plate 1 and that is parallel to the main surfaces.

Here, a "line-symmetric shape" refers to a shape in which the maximum deviation of the deviations of the contours of edge surfaces in a direction that is parallel to the main surfaces at positions in the thickness direction obtained when the contour of a cross-sectional shape thereof is folded back with respect to the center line that passes through the center of the glass plate 1 in the thickness direction of the glass plate 1 and that is parallel to the main surfaces is 30 [μm] or less. The maximum deviation is more preferably 20 [μm] or less. If this maximum deviation exceeds 30 [μm], when the inner hole 3 is held in a film forming device for forming a magnetic film or the like for making the glass plate 1 function as a magnetic disk, the posture of the glass plate 1 is unstable, and problems such as cracking or dropping of the glass plate 1 are likely to occur. Also, a "line-symmetric shape regarding the cross-sectional shape of the inner circumferential edge surface of the glass blank 2" refers to a shape in which the maximum deviation obtained when using the glass blank 2 instead of the glass plate 1 is 30 [μm] or less.

Note that, in order to prevent an opposing portion 20 located at a position that corresponds to the irradiation position 14 of the inner circumferential edge surface 7 across the center of the inner hole 3 from obstructing the optical path, the light concentration position 12 is preferably set to an area above the position of the inner circumferential edge surface 7 (hereinafter, also referred to as the "position A") facing the irradiation position 14 irradiated with the diffused light L2 on the inner circumferential edge surface 7 across the center of the inner hole 3. The light concentration position 12 may be adjusted in various ways in consideration of the specifications of the laser beam L (the inclination angle θ, the diffusion angle ø, and the like), the plate thickness of the glass blank 2, the diameter of the inner hole 3, and the like. Also, the light concentration position 12 is preferably set to be located above a plane including the main surfaces located outward in a radial direction of the position A. Accordingly, it is also possible to obtain the effect of sufficiently widening the area (spot diameter) of the luminous flux of the diffused light L2 at the irradiation position 14. In other words, the light concentration position 12 is preferably spaced apart from the position A outward in the radial direction by a distance of more than 0 mm in a plan view. This distance is more preferably 10 mm or more, and even more preferably 20 mm or more. Although there is no particular limitation on the upper limit of the distance, in order to avoid an increase in the size of an apparatus, it is sufficient that the distance is 300 mm or less, for example. Note that a "plan view" used in this specification refers to a view from a direction perpendicular to the main surfaces of the glass plate.

The laser beam L can be emitted from a laser oscillator (not shown). Also, in order to move the laser beam L (diffused light L2) relative to the inner circumferential edge surface 7 in the circumferential direction of the glass blank 2, it is possible to use a method in which the center of the annular shape of the glass blank 2 is positioned at and fixed to the rotation center of a turntable (not shown), and the glass blank 2 is rotated, for example. It is sufficient that the inner circumferential edge surface 7 of the glass blank 2, which rotates together with the turntable, is scanned along the inner circumferential edge surface 7 with the laser beam L by irradiating the inner circumferential edge surface 7 of the glass blank 2 with the laser beam L. It is sufficient that the relative moving speed between the laser beam L and the inner circumferential edge surface 7 of the glass blank 2 is set to 0.7 to 100 [mm/s], for example.

It is possible to use a $CO_2$ laser beam as the laser beam L, for example. The wavelength of the $CO_2$ laser beam is preferably 3 μm or more. Note that the laser beam L may be a laser beam other than a $CO_2$ laser beam as long as it has an oscillation wavelength at which glass absorbs the laser beam, and examples thereof include CO laser beams (having an oscillation wavelength of about 5 μm or about 10.6 μm) and Er-YAG laser beams (having an oscillation wavelength of about 2.94 μm).

The size and shape of the luminous flux (irradiation spot) of the laser beam L at an irradiation position on the inner circumferential edge surface 7 need only be a circular shape with a diameter of 1 to 10 mm, or may be an elliptical shape having an area equivalent to that of the circular shape. Although the size and shape of the irradiation spot may be selected as appropriate according to the plate thickness of the glass blank 2 to be chamfered, the size of the irradiation spot is preferably larger than the plate thickness of the glass blank 2 at least in the plate thickness direction, from the viewpoint of making the cross-sectional shape of the inner circumferential edge surface 7 line-symmetric.

It is sufficient that an average power density of the luminous flux at the position where the inner circumferential edge surface 7 is irradiated with the laser beam L is 1 to 30 [W/mm$^2$], for example. The average power density is a value obtained by dividing the total power [W] of the laser beam L by the area [mm$^2$] of the luminous flux on a plane including a portion of the inner circumferential edge surface 7 irradiated with the laser beam L (i.e., if part of the luminous flux protrudes from the inner circumferential edge surface 7, the area of the protruding portion is also included). It is sufficient that the total power of the laser beam L is 10 to 300 [W], for example.

When the inner circumferential edge surface 7 is irradiated with the diffused light L2, the inner circumferential edge surface 7 is preferably irradiated with the laser beam L such that the central axis of the luminous flux of the diffused light L2 passes above the center of the annular shape of the glass blank 2 (a position above the glass blank 2 on the central axis of the glass blank 2 that is orthogonal to the main surfaces). Accordingly, the angle at which the laser beam L is incident on the inner circumferential edge surface 7 approaches vertical. Therefore, energy loss caused by reflection of the laser beam L can be minimized, and thus the chamfered surface 5 can be efficiently formed.

Further, it is preferable to heat the glass blank 2 before and/or during irradiation with the laser beam L. This makes it possible to reduce residual strain that occurs in the vicinity of the inner circumferential edge surface after chamfering performed using the laser beam L. As a heating method, it is sufficient that the temperature of the entire glass blank 2 is increased by disposing a heater or the like in the vicinity of the glass blank 2, for example. An infrared heater such as a halogen lamp heater, a carbon heater, or a sheathed heater can be used as the heater, for example.

By irradiating the inner circumferential edge surface 7 with the diffused light L2 of the laser beam L that has passed through the light concentration position 12 in this manner, a reflective mirror need not be disposed in the inner hole 3 as is conventional, and thus the path on which the glass blank 2 and the glass plate 1 are transported is not restricted, and it is possible to simplify a device configuration.

Figure 4:
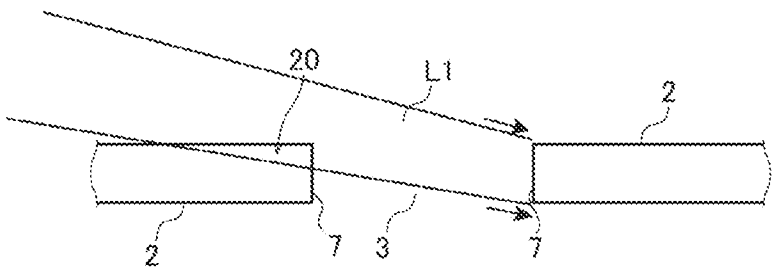
FIG. 4 is a diagram illustrating photoirradiation performed in a method for manufacturing a glass plate using diffused light.

FIG. 4 is a diagram illustrating photoirradiation performed in a method for manufacturing the glass plate 1 using a method different from that of the present invention. FIG. 4 shows an example in which the inner circumferential edge surface 7 is irradiated with a convergent light L1. Because the luminous flux of the convergent light L1 further spreads as the distance from the irradiation position 14 of the inner circumferential edge surface 7 increases, the opposing portion 20 of the glass blank 2 that faces the irradiation position 14 of the inner circumferential edge surface 7 that is irradiated with the laser beam L obstructs the luminous flux and part of the light is scattered, or even if the convergent light L1 passes therethrough, the intensity of transmitted light decreases, making it difficult to form the chamfered surface 5, or it is not possible to secure enough light intensity to make the cross-sectional shape of the inner circumferential edge surface line-symmetric.

As described above, an inclination angle θ (see FIG. 3) of the central axis of the luminous flux of the diffused light L2 (laser beam) with respect to the main surfaces is preferably small to make a cross-sectional shape of the inner circumferential edge surface line-symmetric, and is preferably 20 degrees or less, more preferably 15 degrees or less, and even more preferably 10 degrees or less. Also, the inner circumferential edge surface 7 is preferably irradiated with the diffused light L2 in a direction inclined with respect to one main surface of the glass blank 2 from only the main surface side. In this case, it is possible to firmly fix the glass blank 2 thereto from the other main surface side opposite to the one main surface side, and to suppress positional shift of the glass blank 2. Because this enables precise shape control, the inner circumferential edge surface can be easily made line symmetric as described above over the entire inner circumferential edge surface. Also, it is possible to significantly simplify the device configuration. The minimum value of the inclination angle θ is not particularly limited, and is preferably one degree or more, for example. If the inclination angle θ is less than one degree, it may be difficult to adjust the optical system during mass production.

Also, from the viewpoint of easily reducing the inclination angle θ, a diffusion angle ø of the laser beam L (see FIG. 4. The diffusion angle ø refers to an angle indicating narrowing or spreading of the luminous flux when being concentrated or diffused) is preferably 20 degrees or less, more preferably 10 degrees or less, and even more preferably 5 degrees or less in terms of full-angle divergence. Further, the smaller the diffusion angle ø is, the easier it is to move the positions of the laser oscillator and/or optical system components such as lenses relatively far from the glass blank 2 that is to be processed, and thus there is also the advantage of increased freedom in designing an auxiliary device that loads/unloads the glass blank 2 to/from the photoirradiation device, for example. The minimum value of the diffusion angle ø is not particularly limited, and is preferably 0.5 degree or more in terms of full-angle divergence, for example. If the diffusion angle ø is less than 0.5 degrees, the apparatus may increase in size.

Although there is no particular limitation on a method for manufacturing the glass blank 2 to be irradiated with the laser beam L, the glass blank 2 is manufactured using a float method, a downdraw method, or a pressing method, for example. It is possible to obtain a plurality of disk-shaped glass plates each provided with an inner hole from wide glass sheets manufactured using a float method or a downdraw method. In a method for obtaining disk-shaped glass plates from wide glass sheets, disk-shaped glass plates may be obtained through cutting with use of a well-known scriber, or by irradiating the glass plates with a laser beam to form a circular defect, and cut out into an annular shape.

An apparatus for processing a glass plate according to an embodiment is configured to carry out the above-described method for manufacturing a glass plate. The apparatus for processing a glass plate includes a photoirradiation device. The photoirradiation device includes a laser oscillator and optical system components. The optical system components include lenses such as the condenser lens 10, and the like. Also, the apparatus for processing a glass plate may include a holding portion that holds a glass blank by fixing or placing the glass blank, for example, and a rotation mechanism for rotating the holding portion. Furthermore, the apparatus for processing a glass plate may be provided with a turntable in which functions of the holding portion and the rotation mechanism are integrated with each other.

If a magnetic-disk glass substrate is manufactured from the glass plate 1 provided with the above-described chamfered surfaces 5, various processes that will be described below are performed such that the glass plate 1 has properties suitable for a magnetic-disk glass substrate, which will be a final product.

The main surfaces of the glass plate 1 are ground and polished.

In grinding and polishing processing, the glass plate 1 is ground and/or polished. When grinding and polishing are both to be performed, polishing is performed after grinding.

In grinding processing, a double-side grinding apparatus provided with a planetary gear mechanism is used to grind a pair of main surfaces of the glass plate 1. Specifically, the main surfaces on both sides of the glass plate 1 are ground while the outer circumferential edge surface of the glass plate 1 is held in a holding hole provided in a holding member (grinding carrier) of the double-side grinding apparatus. The double-side grinding apparatus has a pair of upper and lower surface plates (an upper surface plate and a lower surface plate), and the glass plate 1 is held between the upper surface plate and the lower surface plate. Then, it is possible to grind the two main surfaces of the glass plate 1 by moving the glass plate 1 and the surface plates relative to each other while moving one or both of the upper surface plate and the lower surface plate and supplying coolant. Grinding members obtained by forming fixed abrasive particles in which diamond microparticles are fixed by resin into a sheet shape are mounted on the surface plates, and then grinding processing can be performed, for example.

Then, first polishing is performed on a pair of main surfaces of the ground glass plate 1. Specifically, the main surfaces on both sides of the glass plate 1 are polished while the outer circumferential edge surface of the glass plate 1 is held in a holding hole provided in a polishing carrier of the double-side polishing apparatus. The first polishing is performed in order to remove blemishes and strain remaining on the ground main surfaces or adjust minute unevenness (micro-waviness, roughness) remaining on the surfaces.

In the first polishing processing, the glass plate 1 is polished using a double-side polishing apparatus having a configuration similar to that of the above-described double-side grinding apparatus that is used in the grinding processing with fixed abrasive particles, while a polishing slurry is provided. In the first polishing processing, a polishing slurry containing loose abrasive particles is used. Cerium oxide abrasive particles, zirconia abrasive particles, or the like are used as loose abrasive particles used in the first polishing, for example. Similar to the double-side grinding apparatus, the glass plate 1 is also held between the upper surface plate and the lower surface plate in the double-side polishing apparatus. Flat polishing pads (resin polishers, for example) having an annular shape overall are attached to the upper surface of the lower surface plate and the bottom surface of the upper surface plate. The glass plate 1 and the surface plates are moved relative to each other by moving one or both of the upper surface plate and the lower surface plate, and thereby the two main surfaces of the glass plate 1 are polished. The size of polishing abrasive particles is preferably in a range of 0.5 to 3 μm in terms of an average particle diameter (D50).

The glass plate 1 may be chemically strengthened after the first polishing. In this case, a melt in which potassium nitrate and sodium nitrate are mixed, for example, can be used as a chemical strengthening liquid, and the glass plate 1 is immersed in the chemical strengthening liquid. Accordingly, it is possible to form a compressive stress layer on the surface of the glass plate 1 through ion exchange.

Then, the second polishing is performed on the glass plate 1. The second polishing processing is performed in order to mirror-polish the main surfaces. A double-side polishing apparatus having a configuration that is similar to that of the double-side polishing apparatus used in the first polishing is used in the second polishing as well. Specifically, the main surfaces on both sides of the glass plate 1 are polished while the outer circumferential edge surface of the glass plate 1 is held in a holding hole provided in a polishing carrier of the double-side polishing apparatus. The second polishing processing differs from the first polishing processing in that the type and particle size of loose abrasive particles are different, and the hardness of the resin polishers is different. It is preferable that the hardness of a resin polisher is smaller than that in the first polishing processing. A polishing liquid containing colloidal silica as the loose abrasive particles is supplied between the polishing pads of the double-side polishing apparatus and the main surfaces of the glass plate 1, and the main surfaces of the glass plate 1 are polished, for example. The size of polishing abrasive particles used in the second polishing is preferably in a range of 5 to 50 nm in terms of an average particle diameter (d50). It is preferable that the roughness of the pair of main surfaces of the glass plate 1 obtained after the second polishing is 0.2 nm or less in terms of the arithmetic average roughness Ra (JIS B0601 2001). The surface roughness can be measured through AFM, for example.

Whether or not chemical strengthening processing is to be carried out need only be selected as appropriate in consideration of the composition of the glass and how necessary chemical strengthening processing may be therefor. Also, other polishing processing may be further added in addition to the first polishing processing and the second polishing processing, or processing for polishing two main surfaces may be completed through a single polishing process. Also, the order of the above-described processes may be changed as appropriate.

In this manner, it is possible to manufacture a magnetic-disk glass substrate that satisfies the conditions required for a magnetic-disk glass substrate by manufacturing the glass plate 1 provided with the chamfered surfaces 5 on edge surfaces by irradiating the edge surfaces with the laser beam L (diffused light L2) described above, and then grinding or polishing the main surfaces of the glass plate 1.

Thereafter, a magnetic disk is manufactured by forming a magnetic film on at least a main surface of the magnetic-disk glass substrate.

Note that edge surface polishing for polishing edge surfaces (the inner circumferential edge surface and/or the outer circumferential edge surface) of the glass plate 1 may be performed after the chamfered surfaces 5 have been formed by irradiating the edge surfaces with the laser beam L (diffused light L2).

Even if such edge surface polishing is performed, an arithmetic average roughness Ra of an edge surface of the glass plate 1 provided with a chamfered surface 5 through irradiation with the laser beam L can be set to 50 nm or less and/or Rz can be set to 500 nm or less, and thus it is possible to shorten the time required for edge surface polishing.

Edge surface polishing may be performed using a polishing brush method in which polishing is performed using a polishing brush while loose abrasive particles are supplied to edge surfaces. However, in order to increase production efficiency, it is preferable to grind or polish the main surfaces of the glass plate 1 without performing edge surface polishing. That is to say, it is preferable to grind or polish the main surfaces of the glass plate 1 while maintaining the surface roughness of an edge surface of the glass plate 1 at the surface roughness of the edge surface obtained through irradiation with the laser beam L. Note that, because the surface roughness of an edge surface formed through irradiation with the laser beam L performed in this embodiment is low, there are cases where the formation of the chamfered surface 5 also serves as edge surface polishing. In this case, the above-described edge surface polishing refers to additional edge surface polishing other than edge surface polishing performed simultaneously with the formation of the chamfered surface 5.

Note that additional edge surface polishing is preferably performed before first polishing is performed. If additional edge surface polishing is performed after first polishing, the polished main surfaces may be scratched. Also, additional edge surface polishing may be performed before or after processing for grinding main surfaces is performed.

It is possible to use amorphous glass such as aluminosilicate glass, soda lime glass, or borosilicate glass as the glass material of the glass plate 1 and the glass blank 2, which is a base of the glass plate 1. In particular, the glass material is preferably amorphous glass in that it is possible to produce a magnetic-disk glass substrate having excellent strength and having main surfaces with excellent flatness. Also, it is preferable that the glass transition temperature Tg of the glass plate 1 and the glass transition temperature Tg of the glass blank 2 are preferably in a range of 450° C. to 850° C. so that the glass plate 1 and the glass blank 2 can withstand heating when forming a magnetic film.

Experiment Example 1

Whether or not luminous flux is blocked by an annular glass blank when irradiation conditions under which the inner circumferential edge surface of the glass blank was irradiated with the laser beam L were changed in various ways was checked through simulation.

(Simulation Conditions)

The shape of an annular glass blank: the outer diameter was 97 mm, the inner diameter was 25 mm, and the thickness was 1 mm, and the cross-section of the inner circumferential edge surface had the same shape as that shown in FIG. 1C above.

The inner circumferential edge surface of the above glass blank was irradiated under various conditions such that the inclination angle θ, the diffusion angle ø, the irradiation spot diameter of the laser beam, an irradiation method (convergent light or diffused light), and the distance from the irradiation position 14 to the light concentration position 12 (the distance in a plan view) were changed as shown in Table 1. In order to simplify calculation, the irradiation spot diameter was set to the maximum length of a cross-section of the luminous flux in the plate thickness direction of the glass plate at the position at which the inner circumferential edge surface was irradiated (i.e., the irradiation spot diameter is not the length obtained from a cross-section perpendicular to the central axis of the laser beam L with the inclination angle θ). Also, the center of the irradiation spot diameter was aligned with the center of the inner circumferential edge surface in the plate thickness.

Evaluation results: when the luminous flux was blocked even slightly by a glass blank, a BAD evaluation was given (i.e., a case shown in FIG. 4), and when the luminous flux was not blocked at all, a GOOD evaluation was given (i.e., a case shown in FIG. 3).

TABLE 1

| Condition | Inclination angle θ (degrees) | Diffusion angle ø (degrees) | Irradiation spot diameter (mm) | Irradiation method | Distance from irradiation position to light concentration position (focal position) (mm) | Evaluation results |
|---|---|---|---|---|---|---|
| 1 | 20 | 20 | 10 | Convergent light | — | BAD |
| 2 | 20 | 20 | 10 | Diffused light | 25 | GOOD |
| 3 | 15 | 20 | 4 | Convergent light | — | BAD |
| 4 | 15 | 20 | 4 | Diffused light | 11 | GOOD |
| 5 | 10 | 10 | 4 | Convergent light | — | BAD |
| 6 | 10 | 10 | 4 | Diffused light | 23 | GOOD |
| 7 | 5 | 7 | 3 | Convergent light | — | BAD |
| 8 | 5 | 7 | 3 | Diffused light | 24 | GOOD |
| 9 | 5 | 4 | 3 | Convergent light | — | BAD |
| 10 | 5 | 4 | 3 | Diffused light | 43 | GOOD |
| 11 | 5 | 3 | 3 | Convergent light | — | BAD |
| 12 | 5 | 3 | 3 | Diffused light | 55 | GOOD |
| 13 | 5 | 4 | 2 | Convergent light | — | BAD |
| 14 | 5 | 4 | 2 | Diffused light | 27 | GOOD |

As can be seen from Table 1, it was found that, even in a case where the luminous flux is blocked under the conditions in which conventional convergent light is used, use of the diffused light enables an inner circumferential edge surface to be irradiated with the laser beam without blocking the luminous flux.

When the distance from the irradiation position to the light concentration position exceeds 25 mm, the focal point in a plan view is located outward of the inner diameter end of the glass blank in the radial direction. That is to say, the focal point is located outward of the above-described "position A" in the radial direction. In such a case, the positions of the laser oscillator and/or optical system components such as lenses can be relatively easily distanced from a glass blank that is to be processed. Such a case is preferable because the degree of freedom in designing an auxiliary device that loads/unloads the glass blank to/from the photoirradiation device is increased, for example.

Experiment Example 2

Chamfering processing was actually performed on inner circumferential edge surfaces of glass blanks under conditions 10, 12, and 14 in Table 1. Chamfering processing was performed in the same manner as in Experiment Example 1, except that the shape of the annular glass blank was changed such that the thickness thereof was 0.7 mm. Amorphous aluminosilicate glass having a glass transition point of about 500° C. was used as a material of the glass blank. A $CO_2$ laser was used as the laser beam L. Before irradiation with the laser beam L, the entirety of the main surfaces of the glass blank 2 were heated using an infrared heater. Other conditions and methods for carrying out irradiation were adjusted as appropriate with reference to the above-described embodiment, such that an inner circumferential edge surface obtained after chamfering processing had a cross-sectional shape similar to that in FIG. 1B.

As a result, the inner circumferential edge surface of the obtained glass plate had a cross-sectional shape similar to that shown in FIG. 1B, and was provided with chamfered surfaces under any conditions. Also, the surface roughness of the inner circumferential edge surface thereof was 50 nm or less in terms of the arithmetic average roughness Ra (measured using a laser microscope). Further, the inner circumferential edge surface was line-symmetric with respect to the center line that passes through the center of the glass plate in the thickness direction of the glass plate and that is parallel to the main surfaces.

As described above, although a method for manufacturing a glass plate, a method for manufacturing a magnetic-disk glass substrate, a method for manufacturing a magnetic disk, and an apparatus for processing a glass plate according to the present invention have been described in detail, the present invention is not limited to the above-described embodiments, and it will be appreciated that various improvements and modifications can be made without departing from the gist of the present invention.

The invention claimed is:

1. A method for manufacturing a glass plate, the method comprising:

processing for irradiating an inner circumferential edge surface extending along an inner hole of a glass plate with a laser beam along the inner circumferential edge surface, wherein, in the processing, when the inner circumferential edge surface is irradiated with the laser beam, the laser beam is concentrated by a condenser lens and formed into diffused light, and the inner circumferential edge surface is irradiated with the diffused light from a direction inclined with respect to one of main surfaces of the glass plate, and a position where the laser beam is concentrated by the condenser lens is located above a plane that includes the one of the main surfaces outward in a radial direction of a position on the inner circumferential edge surface that faces an irradiation position on the inner circumferential edge surface that is irradiated with the laser beam across the center of the inner hole, an inclination angle of a central axis of the laser beam with respect to the one of the main surfaces is 20 degrees or less, a diffusion angle of the laser beam is 20 degrees or less, and the irradiating of the inner circumferential edge surface is performed without a reflective mirror being disposed in the inner hole.

2. The method for manufacturing a glass plate according to claim 1, wherein corner portions present between the inner circumferential edge surface and the main surfaces on both sides of the glass plate are chamfered through the processing, and a cross-sectional shape of the inner circumferential edge surface in which the corner portions are chamfered is line-symmetric with respect to a center line that passes through the center of the glass plate in a thickness direction of the glass plate and that is parallel to the main surfaces.

3. The method for manufacturing a glass plate according to claim 1, wherein the glass plate is a glass substrate that is a base of a glass substrate for a magnetic disk.

4. The method for manufacturing a glass plate according to claim 1, wherein the main surfaces of the glass plate are ground or polished without polishing the inner circumferential edge surface, after irradiation with the laser beam.

5. A method for manufacturing a magnetic-disk glass substrate, wherein, after the glass plate is manufactured using the method for manufacturing a glass plate according to claim 1, the magnetic-disk glass substrate is manufactured by grinding or polishing the main surfaces of the glass plate.

6. A method for manufacturing a magnetic disk, wherein a magnetic film is formed on the one of the main surfaces of the glass plate manufactured using the method for manufacturing a magnetic-disk glass substrate according to claim 5.

* * * * *